(12) United States Patent
Takagi et al.

(10) Patent No.: US 10,626,025 B2
(45) Date of Patent: Apr. 21, 2020

(54) WATER-PURIFICATION CARTRIDGE AND WATER PURIFIER

(71) Applicant: KOTOBUKI TSUSHOU Co., Ltd., Kitakyushu-shi, Fukuoka (JP)

(72) Inventors: Toshio Takagi, Kitakyushu (JP); Jutaro Takagi, Kitakyushu (JP)

(73) Assignee: KOTOBUKI TSUSHOU CO., LTD., Kitakyushu-Shi, Fukuoka (JP)

( * ) Notice: Subject to any disclaimer, the term of this patent is extended or adjusted under 35 U.S.C. 154(b) by 0 days.

(21) Appl. No.: 16/326,452

(22) PCT Filed: Aug. 9, 2017

(86) PCT No.: PCT/JP2017/028925
§ 371 (c)(1),
(2) Date: Feb. 19, 2019

(87) PCT Pub. No.: WO2018/043079
PCT Pub. Date: Mar. 8, 2018

(65) Prior Publication Data
US 2019/0345040 A1    Nov. 14, 2019

(30) Foreign Application Priority Data
Aug. 29, 2016   (JP) ................ 2016-166970

(51) Int. Cl.
*C02F 1/28*   (2006.01)
*B01D 24/10*   (2006.01)
(Continued)

(52) U.S. Cl.
CPC .............. *C02F 1/283* (2013.01); *B01D 24/10* (2013.01); *B01D 24/40* (2013.01); *B01D 35/147* (2013.01);
(Continued)

(58) Field of Classification Search
CPC .. C02F 1/003; C02F 1/283; C02F 1/50; C02F 9/005; C02F 2201/005; C02F 2201/006;
(Continued)

(56) References Cited

U.S. PATENT DOCUMENTS 4,904,382 A    2/1990   Thomsen
6,447,680 B1 *  9/2002   Richard ................ B01D 29/15
                                                  210/532.2
7,235,176 B1   6/2007   Takagi et al.

FOREIGN PATENT DOCUMENTS

DE    3238374 A1    4/1984
JP    10281338 A    10/1998
(Continued)

OTHER PUBLICATIONS

ISA Japan Patent Office, International Search Report Issued in Application No. PCT/JP2017/028925, dated Oct. 3, 2017. WIPO, 4 pages.

*Primary Examiner* — Matthew O Savage
(74) *Attorney, Agent, or Firm* — Alleman Hall Creasman & Tuttle LLP

(57) ABSTRACT

Provided is a water-purification cartridge to be replaceably accommodated in an accommodating portion of a water purifier. The cartridge includes activated carbon that removes impurities from water, forms, within the water purifier, a raw water flow path through which raw water flows downstream without passing through the activated carbon and a water purification flow path through which raw water flows downstream while passing through the activated carbon, and further includes a buffer portion that is disposed, within the water purifier, at a position upstream of flow path switching valves for selecting discharge from the raw water flow path or discharge from the water purification flow path and downstream of the activated carbon and that cuts off a (Continued)

water hammer propagating from the flow path switching valves to the activated carbon.

13 Claims, 5 Drawing Sheets

(51) Int. Cl.
*B01D 24/40* (2006.01)
*B01D 35/147* (2006.01)
*C02F 1/00* (2006.01)
*B01D 35/157* (2006.01)
*C02F 1/50* (2006.01)
*B01D 39/20* (2006.01)
*C02F 9/00* (2006.01)

(52) U.S. Cl.
CPC .......... *C02F 1/003* (2013.01); *B01D 35/1573* (2013.01); *B01D 39/2062* (2013.01); *B01D 2101/02* (2013.01); *B01D 2201/165* (2013.01); *B01D 2201/29* (2013.01); *B01D 2201/347* (2013.01); *C02F 1/50* (2013.01); *C02F 9/005* (2013.01); *C02F 2201/005* (2013.01); *C02F 2201/006* (2013.01); *C02F 2301/04* (2013.01)

(58) Field of Classification Search
CPC ..... C02F 2301/04; B01D 24/10; B01D 24/40; B01D 35/147; B01D 35/1573; B01D 39/2062; B01D 2101/02; B01D 2201/29; B01D 2201/347
USPC .............................. 210/354, 356, 460, 493.2
See application file for complete search history.

(56) References Cited

FOREIGN PATENT DOCUMENTS

| | | |
|---|---|---|
| JP | 200117342 A | 1/2001 |
| JP | 2005226690 A | 8/2005 |
| JP | 2012092580 A | 5/2012 |

\* cited by examiner

FIG. 4

● Pressure at each point when switching from a state in which raw water passes to a state in which purified water passes is performed

[MPa]

| Point A | | Point B | | Point C | | Point D | |
|---|---|---|---|---|---|---|---|
| During discharge of raw water | When switching from raw water to purified water is performed | During discharge of raw water | When switching from raw water to purified water is performed | During discharge of raw water | When switching from raw water to purified water is performed | During discharge of raw water | When switching from raw water to purified water is performed |
| 0.05 | 0.11 | 0.05 | 0.11 | 0.03 | 0.11 | 0.04 | 0.04 |
| 0.09 | 0.19 | 0.09 | 0.19 | 0.06 | 0.19 | 0.08 | 0.08 |
| 0.14 | 0.26 | 0.13 | 0.27 | 0.09 | 0.27 | 0.12 | 0.12 |

FIG. 5

- Pressure at each point when switching from a state in which purified water passes to a state in which raw water passes is performed

[MPa]

| Point A | | Point B | | Point C | | Point D | |
|---|---|---|---|---|---|---|---|
| During discharge of purified water | When switching from purified water to raw water is performed | During discharge of purified water | When switching from purified water to raw water is performed | During discharge of purified water | When switching from purified water to raw water is performed | During discharge of purified water | When switching from purified water to raw water is performed |
| 0.08 | 0.08 | 0.08 | 0.08 | 0.08 | 0.08 | 0.02 | 0.04 |
| 0.14 | 0.14 | 0.14 | 0.14 | 0.14 | 0.14 | 0.04 | 0.08 |
| 0.20 | 0.20 | 0.20 | 0.20 | 0.20 | 0.20 | 0.06 | 0.12 |

WATER-PURIFICATION CARTRIDGE AND WATER PURIFIER

TECHNICAL FIELD

The present invention relates to a water-purification cartridge to be replaceably accommodated in a water purifier that is used in a kitchen, toilet, bathroom, or the like and removes impurities from tap water (raw water).

BACKGROUND ART

As a water purifier that is used while attached to an end of water supply equipment in homes and the like, there has been proposed a water purifier in which a water-purification cartridge having a purification material for removing impurities from raw water is replaceably accommodated.

Also, there has been proposed a water purifier that has a raw water flow path through which raw water is discharged as is, a water purification flow path through which purified water obtained by filtering raw water through a water-purification cartridge is discharged, and a flow path switching valve for switching between the discharge of raw water and the discharge of purified water, the flow path switching valve being provided downstream of the water-purification cartridge (Patent Literature 1).

CITATION LIST

Patent Literature

Patent Literature 1: JP 2001-17342A

In a water purifier such as those described above, since the raw water flow path is instantaneously closed during switching from the discharge of raw water to the discharge of purified water, a water hammer or high water pressure occurs and propagates upstream, which may lead to breakage of the purification material of the water-purification cartridge.

Moreover, since the replacement period of a water-purification cartridge is often several months, adhesion of attachment portions between a water purifier and a water-purification cartridge may occur while the water purifier and the water-purification cartridge abut against each other for a long period of time. Thus, during replacement, removal of the water-purification cartridge may be difficult, or breakage may occur.

SUMMARY OF THE INVENTION

Problems to be Solved by the Invention

The present invention was made in order to address the above-described problems, and it is an object thereof to provide a water-purification cartridge that can prevent breakage of a purification material due to a water hammer or high water pressure that occurs during switching from discharge of raw water to discharge of purified water.

Also, it is an object of the present invention to provide a water-purification cartridge that can prevent the adhesion of attachment portions between a water purifier and the water-purification cartridge.

Solution to Problems

In the present invention, means for addressing the above-described problems are as follows.

A first aspect of the invention is a water-purification cartridge to be replaceably accommodated in an accommodating portion of a water purifier, the water-purification cartridge including a purification material that removes impurities from water, wherein the water-purification cartridge forms, within the water purifier, a raw water flow path through which raw water flows downstream without passing through the purification material and a water purification flow path through which raw water flows downstream while passing through the purification material, and the water-purification cartridge further includes a buffer portion that is disposed, within the water purifier, at a position upstream of a flow path switching valve for selecting discharge from the raw water flow path or discharge from the water purification flow path and downstream of the purification material, and that cuts off a water hammer propagating from the flow path switching valve to the purification material.

According to a second aspect of the invention, in the raw water flow path, a downstream-side face of the buffer portion has a flat surface that is approximately perpendicular to a direction in which the water-purification cartridge is attached to the water purifier.

According to a third aspect of the invention, the water-purification cartridge also has, at a position that corresponds to an upstream end thereof when disposed in the accommodating portion, a flat surface that is approximately perpendicular to the direction in which the water-purification cartridge is attached to the water purifier.

According to a fourth aspect of the invention, in the water purification flow path, an upstream-side face of the buffer portion has a flat surface that is approximately perpendicular to the direction in which the water-purification cartridge is attached to the water purifier.

A fifth aspect of the invention is a water-purification cartridge to be replaceably accommodated in an accommodating portion of a water purifier, the water-purification cartridge including a purification material that purifies water, wherein the water-purification cartridge forms, within the water purifier, a raw water flow path through which raw water flows downstream without passing through the purification material and a water purification flow path through which raw water flows downstream while passing through the purification material, and the water-purification cartridge further includes a buffer portion that is disposed, within the water purifier, at a position upstream of a flow path switching valve for selecting discharge from the raw water flow path or discharge from the water purification flow path, a downstream-side face of the buffer portion facing the raw water flow path, and an upstream-side face of the buffer portion facing the water purification flow path.

Advantageous Effects of Invention

According to the first aspect of the invention, a water-purification cartridge to be replaceably accommodated in an accommodating portion of a water purifier includes a purification material that removes impurities from water, forms, within the water purifier, a raw water flow path through which raw water flows downstream without passing through the purification material and a water purification flow path through which raw water flows downstream while passing through the purification material, and further includes a buffer portion that is disposed, within the water purifier, at a position upstream of a flow path switching valve for selecting discharge from the raw water flow path or discharge from the water purification flow path and downstream of the purification material, and that cuts off a water hammer propagating from the flow path switching valve to the purification material. Thus, the buffer portion absorbs the water hammer or high water pressure, and breakage of the purification material and other members can be prevented.

According to the second aspect of the invention, in the raw water flow path, a downstream-side face of the buffer portion has a flat surface that is approximately perpendicular to a direction in which the water-purification cartridge is attached to the water purifier, and can thereby more efficiently absorb the water hammer or the like and prevent adhesion of an attachment portion between the water purifier and the water-purification cartridge.

According to the third aspect of the invention, the water-purification cartridge also has, at a position that corresponds to an upstream end thereof when disposed in the accommodating portion, a flat surface that is approximately perpendicular to the direction in which the water-purification cartridge is attached to the water purifier. Thus, every time switching from the discharge of raw water to the discharge of purified water is performed, the water hammer or the like is absorbed by this perpendicular flat surface and the water-purification cartridge shifts in the attachment direction, and therefore adhesion of an attachment portion between the water purifier and the water-purification cartridge can be prevented.

According to the fourth aspect of the invention, in the water purification flow path, an upstream-side face of the buffer portion has a flat surface that is approximately perpendicular to the direction in which the water-purification cartridge is attached to the water purifier. Thus, every time switching from the discharge of raw water to the discharge of purified water is performed, water passing through the water purification flow path strikes this perpendicular flat surface and the water-purification cartridge shifts in the attachment direction, and therefore adhesion of an attachment portion between the water purifier and the water-purification cartridge can be prevented.

According to the fifth aspect of the invention, a downstream-side face of the buffer portion faces the raw water flow path, and an upstream-side face of the buffer portion faces the water purification flow path. Thus, every time switching from the discharge of raw water to the discharge of purified water is performed, the buffer portion absorbs the water hammer or the like, whereby the water-purification cartridge shifts in a withdrawal direction, and therefore adhesion of an attachment portion between the water purifier and the water-purification cartridge can be prevented. Moreover, the water-purification cartridge then shifts in the attachment direction, and therefore adhesion of an attachment portion between the water purifier and the water-purification cartridge can be prevented.

BRIEF DESCRIPTION OF DRAWINGS

FIG. 4 is a table showing changes in water pressure that occur when switching from discharge of raw water to discharge of purified water is performed, measured at points A to D in FIG. 2.

FIG. 5 is a table showing changes in water pressure that occur when switching from discharge of purified water to discharge of raw water is performed, measured at points A to D in FIG. 2.

DESCRIPTION OF EMBODIMENTS

Hereinafter, a water purifier and a water-purification cartridge according to a first embodiment of the present invention will be described.

Figure 1:
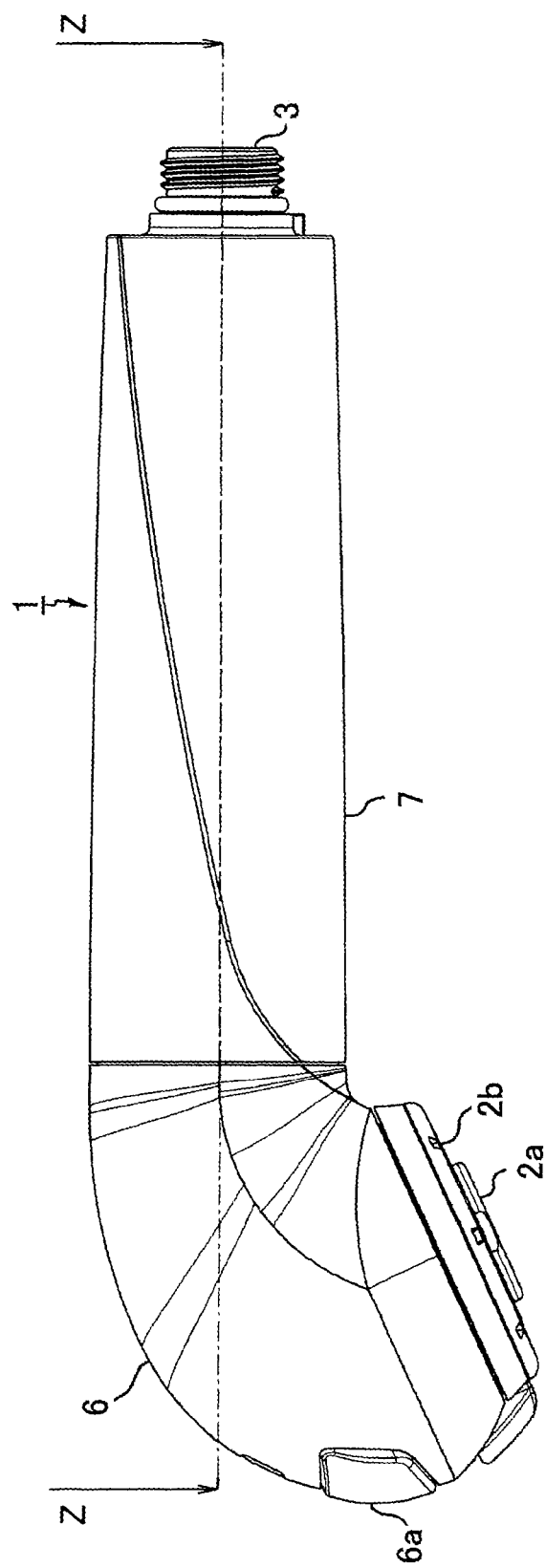
FIG. 1 is a side view of a water purifier in which a water-purification cartridge according to an embodiment of the present invention is accommodated.

As shown in FIG. 1, a water purifier 1 is a shower head-type water purifier that is connected to water supply equipment via a hose or the like and that has discharge ports formed at a leading end thereof.

The water purifier 1 has a straight discharge port 2a and shower discharge ports 2b as the discharge ports, and is provided with a discharge switching valve capable of switching between straight discharge from the straight discharge port 2a and shower discharge from the shower discharge ports 2b.

Note that although a shower head-type water purifier is described in the present embodiment, the contents of the present invention are not limited to this, and the present invention may also be used for water purifiers with other shapes.

Figure 2:
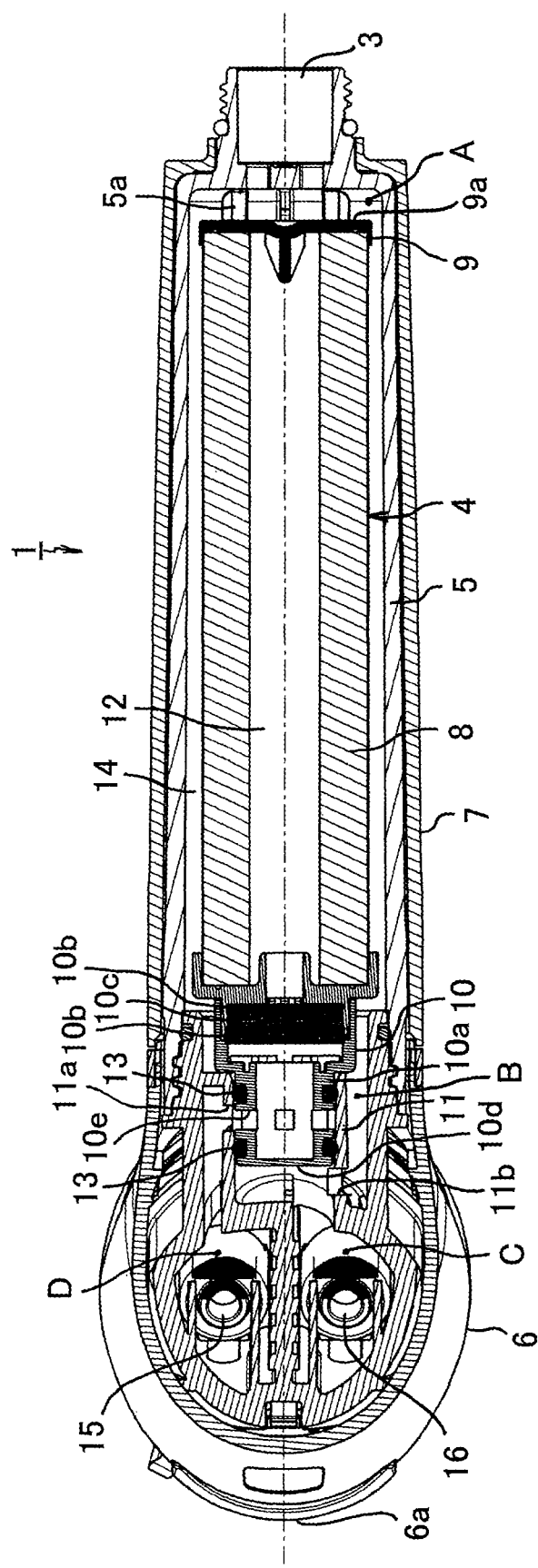
FIG. 2 is a cross-sectional view of the water purifier taken along line Z-Z in FIG. 1.

As shown in FIGS. 1 and 2, a connecting port 3 through which tap water (raw water) is introduced from the hose or the like is formed at a base end of the water purifier 1.

A flow path through which the connecting port 3 is in communication with the discharge ports 2a and 2b is provided inside the water purifier 1, and a substantially cylindrical accommodating portion 5 that accommodates a water-purification cartridge 4 is formed in this flow path.

The water purifier 1 is constituted by a head portion 6 in which the discharge ports 2a and 2b are formed and a grip portion 7 that is configured to be able to be held in one hand by a user, the head portion 6 and the grip portion 7 being joined to each other through screwing. If the purification performance of the water-purification cartridge 4 deteriorates, or trouble occurs in the water-purification cartridge 4, the water purifier 1 can be disassembled to the head portion 6 and the grip portion 7, thereby enabling replacement with a new water-purification cartridge 4.

Figure 3A:
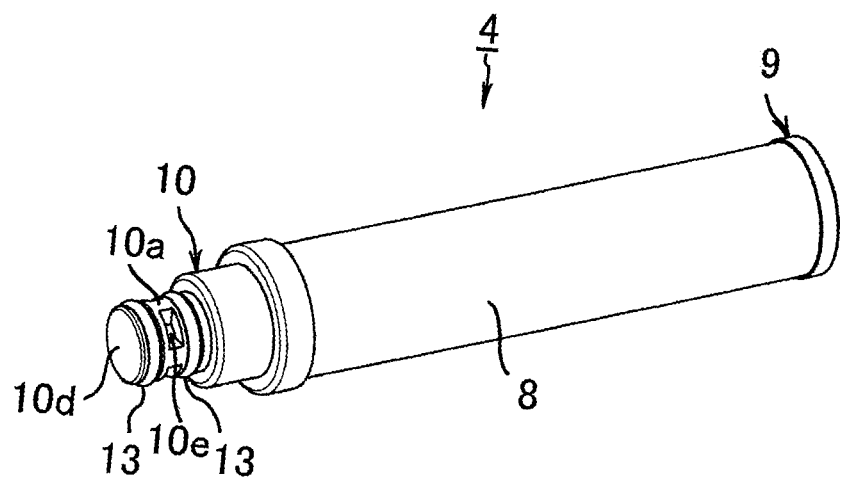
FIGS. 3(a) and 3(b) are perspective views of the water-purification cartridge according to the embodiment of the present invention when viewed from the downstream side and the upstream side, respectively.
Figure 3B:
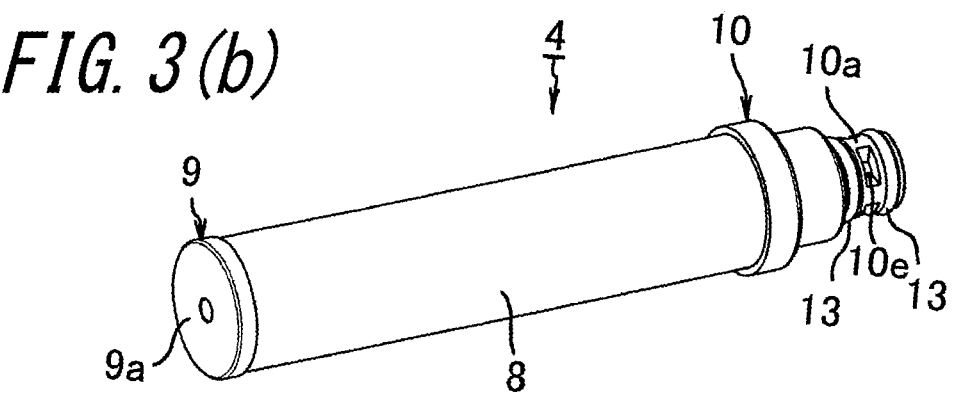

As shown in FIGS. 2, 3(a), and 3(b), the water-purification cartridge 4 is constituted by activated carbon 8 that is packed into a circular cylindrical shape, an upstream-side cap 9 that is attached to the upstream side of the activated carbon 8, and a downstream-side cap 10 that is attached to the downstream side of the activated carbon 8.

When raw water passes through the activated carbon 8, dissolved chemical components and suspended minute solid substances in raw water are adsorbed or filtered out by the activated carbon 8.

An outer circumferential surface of the activated carbon 8 may be covered with a nonwoven fabric or the like.

As shown in FIGS. 3(a) and 3(b), the upstream-side cap 9 has a circular plate portion 9a that closes an upstream end of the activated carbon 8.

As shown in FIG. 2, when the circular plate portion 9a is accommodated in the accommodating portion 5, the circular plate portion 9a abuts against a rib 5a provided to stand at an upstream end of the accommodating portion 5, and is thus positioned in a tube direction. Therefore, the circular plate portion 9a does not block an inlet port for water from the connecting port 3 into the accommodating portion 5.

As shown in FIGS. 2, 3(a), and 3(b), the downstream-side cap 10 covers a downstream end of the activated carbon 8, and has a connecting cylinder portion 10a having a substantially lidded circular cylindrical shape and extending downstream.

The connecting cylinder portion 10a is fit into a cylindrical cartridge support 11 provided in the head portion 6 of the water purifier 1, and the water-purification cartridge 4 is thus positioned and fixed within the accommodating portion 5. A downstream-side end face of the connecting cylinder portion 10a is closed by a circular plate-shaped buffer portion 10d.

A water flow path that is in communication with an internal flow path 12 of the activated carbon 8 is formed in the downstream-side cap 10, and an outlet port 10e of this water flow path is formed in a circumferential surface of the connecting cylinder portion 10a.

O-rings 13 that are provided one on each of the upstream side and the downstream side of the outlet port 10e are fit over an outer circumferential surface of the connecting cylinder portion 10a. Therefore, the connecting cylinder portion 10a is fixed to the cartridge support 11 in a watertight manner.

Water (purified water) that has flowed into the internal flow path 12 from the outer circumference of the activated carbon 8 is supplied into the cartridge support 11, passes through the inside of the head portion 6, and is selectively discharged from the straight discharge port 2a or the shower discharge ports 2b. Nonwoven fabrics 10b for removing fine powder and the like flowing out of the activated carbon 8, and an antibacterial ceramic 10c for preventing the growth of bacteria in accumulated water are disposed in the flow path within the downstream-side cap 10. The downstream-side cap 10 is formed by assembling two components so that the nonwoven fabrics 10b and the antibacterial ceramic 10c can be accommodated.

In this specification, a member that has the function of removing impurities from water or killing various bacteria like the activated carbon 8 or the antibacterial ceramic 10c is referred to as a "purification material".

As shown in FIG. 2, the cartridge support 11 has, in a circumferential surface thereof, a purified water receiving port 11a, which is formed at a position that coincides with the outlet port 10e when the water-purification cartridge 4 is attached, and a raw water receiving port 11b, which is formed at a position that is located downstream of the buffer portion 10d when the water-purification cartridge 4 is attached.

The purified water receiving port 11a is in communication with a purified water cut-off valve 15 in the head portion 6, and the raw water receiving port 11b is in communication with a raw water cut-off valve 16 in the head portion 6.

As a result of the water-purification cartridge 4 being accommodated in the water purifier 1, a raw water flow path is formed in the water purifier 1, through which raw water that has been introduced through the connecting port 3 flows through an outer circumferential-side flow path 14, which is formed between the outer circumferential surface of the activated carbon 8 and an inner wall of the accommodating portion 5, without passing through the activated carbon 8, then flows into the cartridge support 11 through the raw water receiving port 11b, and then flows to the discharge port 2a or the discharge ports 2b via the raw water cut-off valve. Also, a water purification flow path is formed in the water purifier 1, through which raw water that has been introduced through the connecting port 3 passes through the activated carbon 8 from the outer circumferential-side flow path 14 into the internal flow path 12, then flows out through the outlet port 10e of the downstream-side cap 10 into the purified water receiving port 11a, and then flows to the discharge port 2a or the discharge ports 2b via the purified water cut-off valve. The head portion 6 is provided with a flow path switching valve that is operated to selectively close one of the raw water cut-off valve 16 and the purified water cut-off valve 15 and open the other valve by means of a push button 6a.

When the water-purification cartridge 4 is accommodated in the accommodating portion 5 of the water purifier 1, both the upstream-side face and the downstream-side face of the buffer portion 10d constitute flat surfaces that are perpendicular to the attachment direction of the water-purification cartridge 4, that is, the extending direction of the cartridge support 11 and the connecting cylinder portion 10a.

Moreover, when the water-purification cartridge 4 is accommodated in the accommodating portion 5 of the water purifier 1, the circular plate portion 9a also constitutes a flat surface that is perpendicular to the attachment direction of the water-purification cartridge 4.

In this water purifier, when switching from the discharge of raw water, where the raw water flow path is opened, to the discharge of purified water, where the water purification flow path is opened, is performed, the raw water cut-off valve 16 is instantaneously closed, and thus, a water hammer or high water pressure occurs and propagates upstream.

FIG. 4 shows the results of measurement in which water pressure during the discharge of raw water and water pressure that increased when switching from the discharge of raw water to the discharge of purified water was performed were measured at points A to D in FIG. 2. The point A was set at a position upstream of the circular plate portion 9a and near the inlet port of the accommodating portion 5. The point B was set at a position in the raw water flow path and downstream of the purification materials. The point C was set at a position in the raw water flow path and is located downstream of the point B and immediately upstream of the raw water cut-off valve. The point D was set at a position in the water purification flow path and immediately upstream of the purified water cut-off valve.

It was found that, in all of the cases where the water pressure during the discharge of raw water was relatively low (0.05 MPa at the point A), moderate (0.09 MPa at the point A), and relatively high (0.14 MPa at the point A), when switching from the discharge of raw water to the discharge of purified water was performed, the water pressure at the point C rapidly increased, and the water pressure propagated from the point C to the point A without decaying. At this time, the water pressure increased to as high as twice the original water pressure of water supplied to the water purifier 1 during the discharge of raw water, that is, twice the water pressure at the point A during the discharge of raw water.

At the point D, which was located in the water purification flow path and near the purified water cut-off valve, no significant change in the water pressure was measured.

At this time, as shown in FIG. 2, the buffer portion 10d cuts off the water hammer propagating from the raw water cut-off valve 16 to the antibacterial ceramic 10c. Therefore, breakage of the antibacterial ceramic 10c inside can be prevented.

Moreover, the path along which the water hammer from the raw water cut-off valve 16 passes through the inside of the downstream-side cap 10 and reaches the internal flow path 12 of the activated carbon 8 is blocked by the buffer portion 10d. The circular cylindrical activated carbon 8 has a higher density on its inner circumferential side than on the outer circumferential side, and is often resistant to the force applied from the outer circumferential side and relatively weak against the force applied from the inner circumferential side; however, the buffer portion 10d can prevent the water hammer from breaking the activated carbon 8 from the inner circumferential side.

As a result of providing this buffer portion 10d, it is also possible to incorporate a member of low durability as an internal component or a purification material, of the water-purification cartridge 4.

Moreover, a downstream-side end face of the downstream-side cap 10 is closed by the buffer portion 10d, and linear object (not shown) from the outside is prevented from reaching the antibacterial ceramic 10c and the activated carbon 8 through the outlet port 10e in the circumferential surface. With this configuration, even when the water-purification cartridge 4 is dropped or hit against a sharp object during handling, a situation in which, for example, the sharp object pierces the water-purification cartridge approximately parallel to the longitudinal direction of the water-purification cartridge and reaches the internal flow path 12 can be avoided, and therefore breakage of the antibacterial ceramic 10c or the inside of the activated carbon 8 can be prevented.

Moreover, every time the switching from the discharge of raw water to the discharge of purified water is performed, the buffer portion 10d absorbs a water hammer or the like, and therefore the water-purification cartridge shifts in a withdrawal direction. Thus, adhesion of the O-rings and the like, which are attachment portions between the water purifier and the water-purification cartridge, can be prevented.

Furthermore, when a water hammer or the like propagates upstream along the raw water flow path from the raw water receiving port 11b, the moment the water hammer or the like reaches upstream of the upstream-side cap 9, the water pressure on the upstream side of the upstream-side cap 9 becomes higher than that on the downstream side. Thus, the circular plate portion 9a is pressed against from the upstream side, and the water-purification cartridge 4 shifts in the attachment direction, and therefore adhesion of the O-rings 13 and the like, which are attachment portions between the water purifier 1 and the water-purification cartridge 4, can be prevented.

Moreover, the purified water cut-off valve is opened immediately after that, allowing water to flow through the water purification flow path. Therefore, water flowing into the accommodating portion 5 strikes the circular plate portion 9a of the upstream-side cap 9, and water passing through the purification materials and flowing into the downstream-side cap 10 strikes the upstream-side face of the buffer portion 10d, causing the water-purification cartridge 4 to shift in the attachment direction. Thus, adhesion of the O-rings 13 and the like, which are attachment portions between the water purifier 1 and the water-purification cartridge 4, can be prevented.

As described above, as a result of providing the buffer portion 10d and the circular plate portion 9a, breakage of the activated carbon 8 and the antibacterial ceramic 10c due to a water hammer or the like can be prevented, and adhesion of the attachment portions between the water purifier 1 and the water-purification cartridge 4 can be prevented by making effective use of the water hammer or the like.

Moreover, since the buffer portion 10d and the circular plate portion 9a have the flat surfaces that are approximately perpendicular to the attachment direction of the water-purification cartridge 4, the water hammer or the like can be more efficiently absorbed, and adhesion of the attachment portions between the water purifier 1 and the water-purification cartridge 4 can be prevented.

Moreover, the water hammer or the like as well as a water current in the water purification flow path make the water-purification cartridge 4 shift in the withdrawal direction and then shift in the attachment direction. Therefore, movements caused by the shifting in the respective directions offset each other, and unintentional detachment of the water-purification cartridge 4 from the cartridge support 11 can be prevented.

As a result of providing the buffer portion 10d in the downstream-side cap 10 that has the connecting cylinder portion 10a and the O-rings 13, which are attachment portions attached to the water purifier 1, the impact of the water hammer or the like can be more effectively transformed into the shift of the water-purification cartridge 4, and adhesion of the attachment portions between the water purifier 1 and the water-purification cartridge 4 can be prevented.

In addition, although the upstream-side face and the downstream-side face of the buffer portion 10d of the present embodiment constitute flat surfaces that are completely perpendicular to the attachment direction of the water-purification cartridge 4, these faces need not constitute completely flat surfaces. It will not be a problem if these faces have another shape that can more efficiently absorb the water hammer or the like or can effectively transform the impact of the water hammer or the like into the shift of the water-purification cartridge 4. For example, the upstream-side face and the downstream-side face of the buffer portion 10d may have a hemispherical shape, a crater-like shape, a circular cone-like shape, an inverted circular cone-like shape, a trapezoidal shape, or other shapes.

Note that due to water passing through the purification materials, for example, the flow path resistance of the water purification flow path is higher than that of the raw water flow path, and the water pressure near the purified water cut-off valve is low. For this reason, as shown in FIG. 5, when switching from the discharge of purified water to the discharge of raw water was performed, no significant increase in water pressure occurred, except for the point D.

Moreover, the increased water pressures at the point D were lower than the water pressures at the point A during the discharge of purified water.

LIST OF REFERENCE CHARACTERS

1 Water purifier
2a (Straight) Discharge port
2b (Shower) Discharge port
3 Connecting port
4 Water-purification cartridge
5 Accommodating portion
5a Rib
6 Head portion
6a Push button
7 Grip portion
8 Activated carbon
9 Upstream-side cap
9a Circular plate portion
10 Downstream-side cap
10a Connecting cylinder portion
10b Nonwoven fabric
10c Antibacterial ceramic
10d Buffer portion
10e Outlet port
11 Cartridge support
11a Purified water receiving port
11b Raw water receiving port
12 Internal flow path 13 O-ring
14 Outer circumferential-side flow path
15 Purified water cut-off valve
16 Raw water cut-off valve

The invention claimed is:

1. A water purifier in which a water-purification cartridge is replaceably accommodated in an accommodating portion of the water purifier, the water-purification cartridge comprising
a purification material that purifies water,
wherein the water-purification cartridge forms, within the water purifier, a raw water flow path through which raw water flows downstream without passing through the purification material and a water purification flow path through which raw water flows downstream while passing through the purification material, and
the water-purification cartridge further comprises a buffer portion that is disposed, within the water purifier, at a position upstream of a flow path switching valve for selecting discharge from the raw water flow path or discharge from the water purification flow path and downstream of the purification material, and that cuts off a water hammer propagating from the flow path switching valve to the purification material.

2. The water purifier according to claim 1,
wherein in the raw water flow path, a downstream-side face of the buffer portion has a flat surface that is approximately perpendicular to a direction in which the water-purification cartridge is attached to the water purifier.

3. The water purifier according to claim 2,
wherein the water-purification cartridge also has, at a position that corresponds to an upstream end thereof when disposed in the accommodating portion, a flat surface that is approximately perpendicular to the direction in which the water-purification cartridge is attached to the water purifier.

4. The water purifier according to claim 2,
wherein in the water purification flow path, an upstream-side face of the buffer portion has a flat surface that is approximately perpendicular to the direction in which the water-purification cartridge is attached to the water purifier.

5. A water purifier in which a water-purification cartridge is replaceably accommodated in an accommodating portion of the water purifier, the water-purification cartridge comprising
a purification material that purifies water,
wherein the water-purification cartridge forms, within the water purifier, a raw water flow path through which raw water flows downstream without passing through the purification material and a water purification flow path through which raw water flows downstream while passing through the purification material, and
the water-purification cartridge further comprises a buffer portion that is disposed, within the water purifier, at a position upstream of a flow path switching valve for selecting discharge from the raw water flow path or discharge from the water purification flow path, a downstream-side face of the buffer portion facing the raw water flow path, and an upstream-side face of the buffer portion facing the water purification flow path.

6. The water purifier according to claim 5,
wherein in the raw water flow path, the downstream-side face of the buffer portion has a flat surface that is approximately perpendicular to a direction in which the water-purification cartridge is attached to the water purifier.

7. The water purifier according to claim 6,
wherein the water-purification cartridge also has, at a position that corresponds to an upstream end thereof when disposed in the accommodating portion, a flat surface that is approximately perpendicular to the direction in which the water-purification cartridge is attached to the water purifier.

8. The water purifier according to claim 6,
wherein in the water purification flow path, the upstream-side face of the buffer portion has a flat surface that is approximately perpendicular to the direction in which the water-purification cartridge is attached to the water purifier.

9. A water-purification cartridge comprising:
a cylindrical activated carbon filter media extending coaxially around a longitudinal axis;
an upstream side end cap being attached to an upstream end of the cylindrical activated carbon filter media;
a downstream side end cap being attached to a downstream end of the cylindrical activated carbon filter media;
a connecting cylinder attached to the downstream side end cap and extending axially downstream of the downstream side end cap;
a first radial groove and a second radial groove extending around a radially outer surface of the connecting cylinder;
a first O-ring seal disposed in the first radial groove and a second O-ring seal disposed in the second radial groove; and
at least one outlet port extending radially through the connecting cylinder and located axially between the first radial groove and the second radial groove, wherein
the connecting cylinder has a free end that is closed with an imperforate flat circular buffer plate; and
the connecting cylinder has an outermost diameter that is smaller than an outermost diameter of the downstream side end cap such that an axial shoulder is formed between the connecting cylinder and the downstream side end cap.

10. A water-purification cartridge comprising:
an activated carbon filter media extending coaxially around a longitudinal axis;
an upstream side end cap being attached to an upstream end of the activated carbon filter media;
a downstream side end cap being attached to a downstream end of the activated carbon filter media;
a connecting portion attached to the downstream side end cap and extending axially downstream of the downstream side end cap;
a first radial groove and a second radial groove extending around a radially outer surface of the connecting portion;
a first O-ring seal disposed in the first radial groove and a second O-ring seal disposed in the second radial groove; and
at least one outlet port penetrating through the connecting portion and located axially between the first radial groove and the second radial groove, wherein
the connecting portion has a free end that is closed with an imperforate circular buffer portion; and
the connecting portion has an outermost diameter that is smaller than an outermost diameter of the downstream side end cap such that an axial shoulder is formed between the connecting portion and the downstream side end cap.

11. A water-purification cartridge of claim 10, wherein the activated carbon filter media is cylindrical.

12. A water-purification cartridge of claim 11, wherein the activated carbon filter media is hollow.

13. A water-purification cartridge of claim 10, wherein the connecting portion is a cylinder that has the single outermost diameter along substantially its entire length.

* * * * *